T. V. BARNARD.
HARROW.
APPLICATION FILED DEC. 11, 1912.
1,073,318.
Patented Sept. 16, 1913.
2 SHEETS—SHEET 2.
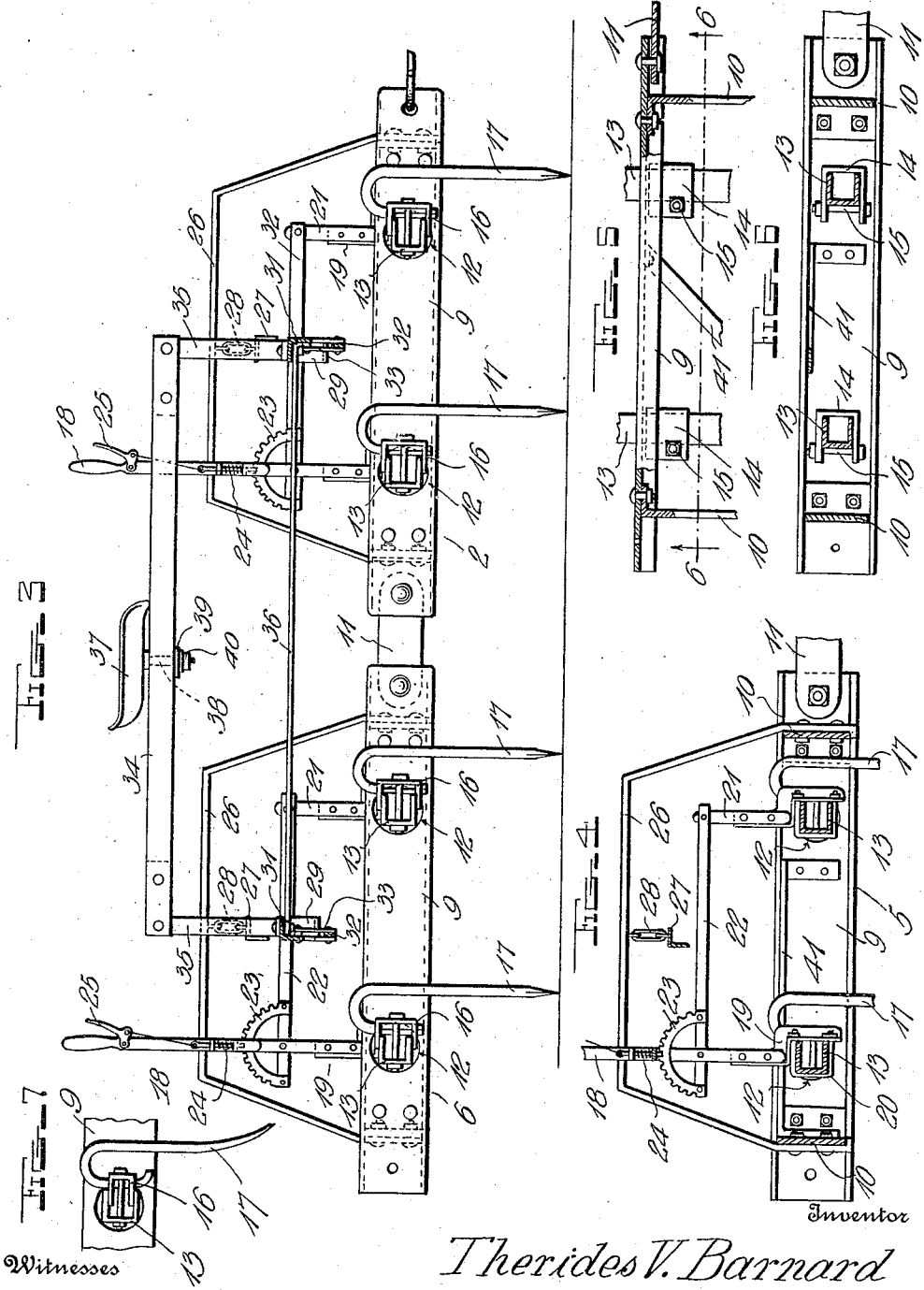
Witnesses
Inventor
Therides V. Barnard
By
Attorneys

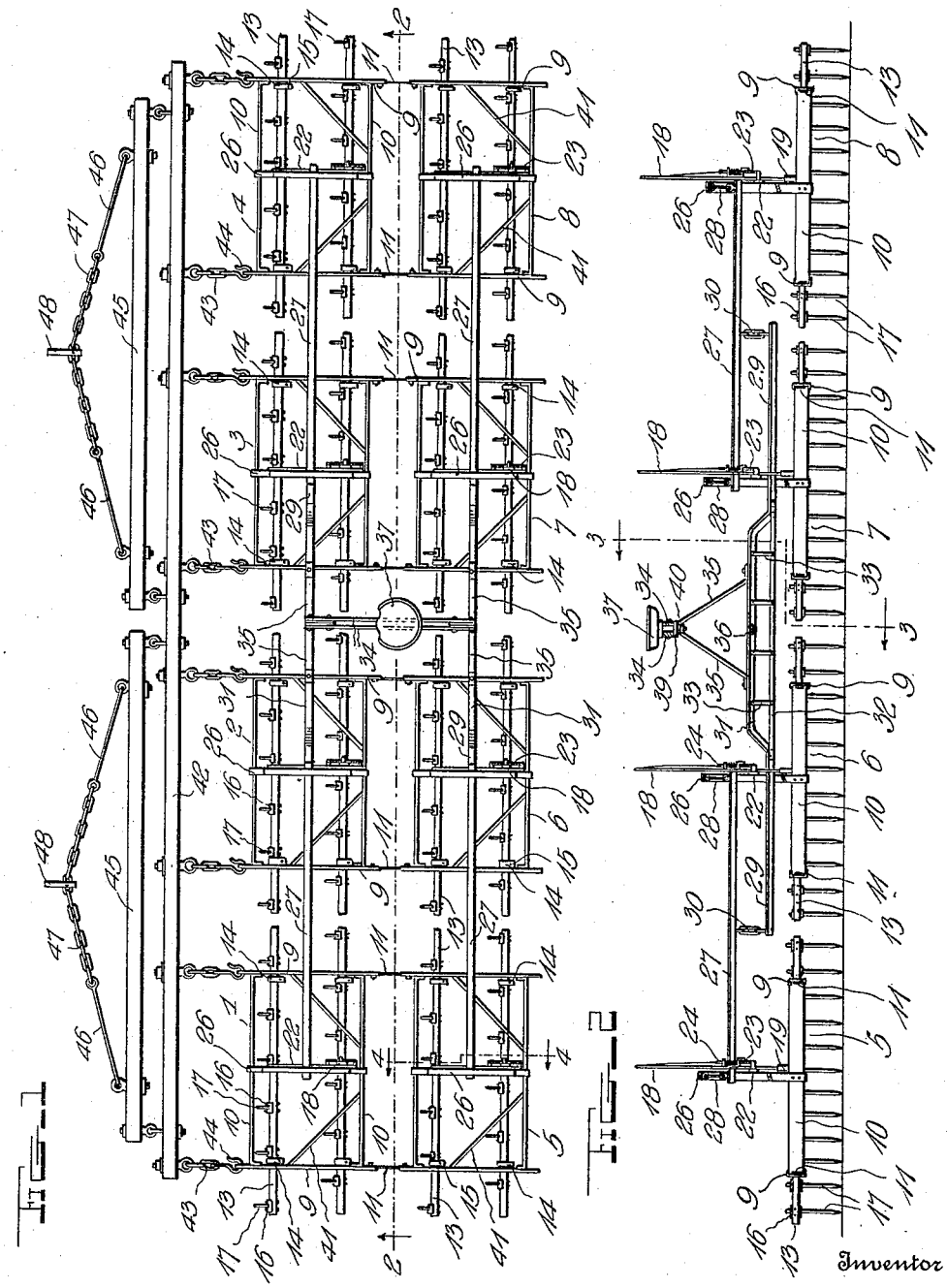

UNITED STATES PATENT OFFICE.

THERIDES V. BARNARD, OF SCHALLER, IOWA.

HARROW.

1,073,318.  Specification of Letters Patent.  Patented Sept. 16, 1913.

Application filed December 11, 1912. Serial No. 736,239.

*To all whom it may concern:*

Be it known that I, THERIDES V. BARNARD, a citizen of the United States, residing at Schaller, in the county of Sac and State of Iowa, have invented certain new and useful Improvements in Harrows; and I do declare the following to be a full, clear, and exact description of the invention, such as will enable others skilled in the art to which it appertains to make and use the same.

This invention relates to improvements in harrows.

The object of the invention is to provide a flexible harrow having an improved construction and arrangement of equalizing seat supporting mechanism.

With this and other objects in view, the invention consists of certain novel features, and the combination and arrangement of parts as will be more fully described and claimed.

In the accompanying drawings, Figure 1 is a top plan view of my improved harrow; Fig. 2 is a vertical cross section on the line 2—2 of Fig. 1; Fig. 3 is a vertical longitudinal section on the line 3—3 of Fig. 2; Fig. 4 is a detail vertical cross sectional view through one of the rear harrow frames taken on the line 4—4 of Fig. 1; Fig. 5 is a plan view of one side of one of the harrow frames with parts broken away and in section, and illustrating more particularly the construction of the longitudinal side bars of the harrow frames and the manner in which the teeth bars are held in engagement with said side bars; Fig. 6 is a vertical sectional view taken on the line 6—6 of Fig. 5; Fig. 7 is a detail side view of a portion of one of the harrow frames and the end of one of the tooth bars thereof showing a modified arrangement of the harrow tooth clamping mechanism.

My improved harrow comprises a series of rectangular frames of which there may be any suitable number, eight of the same being shown in the present instance and numbered respectively 1, 2, 3, 4, 5, 6, 7, 8. The frames are arranged in two transverse rows the first four frames being shown in the front row and the second four in the rear row. When thus arranged the frames in the two rows will be disposed in line or immediately behind each other and the frames of the front row are flexibly connected or coupled to the frames in the rear row, or, in other words, the frames in the front and rear rows are coupled together in pairs as shown.

Each of the harrow frames preferably comprises channel or angle iron side bars 9 which are connected near their ends by flat cross bars 10. The pairs of frames are flexibly connected in any suitable manner, said frames being here shown and are preferably connected by flat plates or links 11, the forward ends of which are pivotally bolted and clamped to the rear ends of the side bars of the front frames while the rear ends of said links are similarly connected to the forward ends of the side bars of the rear frame. In the longitudinal side bars of each of the frames are formed tooth bar receiving apertures 12 with which are loosely engaged U-shaped harrow tooth bars 13, said bars extending across the frames and projecting a suitable distance beyond the sides thereof as shown. Any desired number of harrow tooth bars 13 may be provided, two of the same being shown in the present instance, one of said bars being arranged near the front cross bars of the frames while the other tooth bar is arranged near the rear cross bar of the frames. The bars 13 are, as hereinbefore stated, loosely connected with the apertures 12 to permit said bars to turn therein but are held against longitudinal movement in the side bars of the frame by clips 14 which are engaged therewith and fastened thereto by clamping bolts 15 adjacent to the inner sides of the side bars of the frames as shown. Connected to the bars 13 by channel iron clamping devices 16 are flexible harrow teeth 17 the upper ends of which are bent or doubled over and form shanks which are engaged with the bars 13 and fastened thereto by the clamping devices 16 as shown. The channel iron clamping devices 16 may be inserted into or engaged with the outer sides of the channel iron tooth bars 13 as shown in Figs. 3 and 7 of the drawings.

The tooth bars 13 in each of the frames are provided with means whereby the same may be rocked for the purpose of adjusting the harrow teeth thereon to the desired angle or inclination. The means for rocking said bars for adjusting said teeth comprise hand levers 18 the lower ends of which are secured to brackets 19 which in turn are secured to the rear tooth bars 13 by clips or other suitable clamping devices 20 as shown. Secured to the front bars 13 of the frames are upwardly projecting crank arms 21, said arms being preferably secured to the bars in the same manner as the levers 18. The arms 21 are pivotally connected at their upper ends to the levers 18 by operating bars 22 whereby when the levers are swung forwardly or rearwardly to rock the rear tooth bars 13 the movement of the levers will be imparted through the bars 22 and crank arms 21 to the front tooth bars whereby the latter and the teeth thereon will be simultaneously and correspondingly rocked or adjusted by said levers. Connected to the bars 22 on opposite sides of the levers 18 are segmental racks 23 with which are engaged spring projected pawls 24 carried by the levers, whereby the latter and the parts operated thereby are locked in their adjusted positions. The pawls 24 of the levers are connected with suitable retracting handles 25 pivoted to the upper ends of the levers whereby the pawls may be disengaged from the racks 23 to permit the movement or adjusting of the levers.

Connected to the front and rear cross bars 10 of the harrow frames are arched seat supporting frames 26, said arched frames being preferably bolted at their lower ends to the outer sides of the cross bars 10 and having their extremities bent inwardly at right angles and engaging the lower edges of the bars 10 as shown. The arched frames 26 of the adjoining front harrow frames and the adjoining rear harrow frames on each side of the harrow are connected by auxiliary seat supporting bars 27, the ends of which are loosely connected by links 28 to the center of the seat supporting frames 26, said bars 27 being suspended or swinging beneath the frames 26 as shown. Connected at their ends to the auxiliary seat supporting bars 27 are front and rear main seat supporting bars 29, said bars 29 being loosely connected with and suspended below the bars 27 by links 30, the front bars 29 being secured to the auxiliary bars of the front row of harrow frames while the rear bars 29 are secured to the bars 27 of the rear row of harrow frames as will be understood. The main seat supporting bars 29 have their central portions between the frames 26 of the inner front and rear harrow frames arched or offset upwardly as at 31, said portions of the bars being provided with truss bars 32 between which and the arched portions 31 of the bars 29 are arranged truss braces 33. Arranged between and connected at its ends to the center of the arched portions 31 of the bars 29 is a seat supporting track 34 comprising a pair of parallel longitudinally disposed bars the ends of which are secured to the upper ends of inclined or diverging brace bars 35, the lower ends of which are secured to the arched portions 31 of the main seat supporting bars 29. The arched portion 31 of the bars 29 are further connected by a central longitudinally disposed connecting bar 36, the ends of which are secured to the arched portions 31 between the braces 35 as shown. Slidably and adjustably secured to the track bars 34 is a driver's seat 37, said seat having an attaching bolt 38 which projects downwardly between the bars of the track and is engaged with a clamping plate 39 and has on its lower end a clamping nut 40, whereby the plate 39 is drawn up into clamping engagement with the lower edges of the track bars 34 while the seat is drawn down into engagement with the upper edges of said bars thereby tightly clamping the seat in its adjusted position on the bars. By thus supporting and attaching the seat to the harrow frames, it will be seen that the movement of said frames will be equalized through the flexible connection of the seat supporting bars so that the seat will be maintained in a substantially level position and will not be affected by the irregular movement of the harrow frames in passing over uneven surfaces or obstructions.

The harrow frames are preferably braced by diagonally arranged brace bars 41 which are connected at their forward ends to the side bars of the harrow frames and at their rear ends to the rear cross bars thereof as shown. The harrow frames are provided with suitable draft mechanism which is here shown and preferably comprises a main draft bar 42 which is connected by links 43 and hooks 44 to the forward projecting ends of the side bars of the front row of harrow frames. To the main draft bar 42 are loosely connected auxiliary draft bars 45 to which are secured links 46, said links being connected at their outer ends by chains 47 to which are secured attaching clips 48 to which may be attached whiffle-trees or other draft devices for hitching the draft animals to the harrow.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined and claimed.

Having thus described my invention, what I claim is:

1. A harrow comprising a plurality of flexible frames, harrow tooth bars mounted in said frames, harrow teeth carried by said bars, seat supporting frames arranged on said harrow frames, auxiliary seat supporting bars loosely connected with and suspended from said frames, main seat supporting bars loosely connected with and suspended from said auxiliary bars, a seat supporting track secured to said main seat supporting bars, and a seat adjustably secured to said track.

2. A harrow comprising a plurality of flexibly connected harrow frames, tooth bars mounted therein, harrow teeth carried by said bars, arched seat supporting frames secured to said harrow frames, auxiliary seat supporting bars arranged below and between the arched frames of the front and rear sets of harrow frames on each side of the harrow, links to loosely connect the ends of said auxiliary seat supporting bars with said arched frames, front and rear main seat supporting bars arranged below the front and rear auxiliary seat supporting bars, links to loosely connect and suspend the ends of said main bars with said auxiliary bars, said main seat supporting bars having their central portions arched and trussed, a seat supporting track arranged above and having its ends connected with the arched portions of said main supporting bars midway between their ends, a connecting bar arranged below said track bars and also connecting said main seat supporting bars, and a seat adjustably secured to said track bar.

In testimony whereof I have hereunto set my hand in presence of two subscribing witnesses.

THERIDES V. BARNARD.

Witnesses:
A. J. MARTIN,
C. W. BRIMHALL.

---

Copies of this patent may be obtained for five cents each, by addressing the "Commissioner of Patents, Washington, D. C."